United States Patent
Shin et al.

(10) Patent No.: US 12,242,058 B2
(45) Date of Patent: Mar. 4, 2025

(54) IMAGE DISPLAY DEVICE AND AUGMENTED REALITY DEVICE INCLUDING THE SAME

(71) Applicant: SAMSUNG ELECTRONICS CO., LTD., Suwon-si (KR)

(72) Inventors: Bongsu Shin, Seoul (KR); Geeyoung Sung, Daegu (KR); Sunil Kim, Seoul (KR); Seokil Moon, Suwon-si (KR); Wontaek Seo, Yongin-si (KR); Daeho Yang, Suwon-si (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1002 days.

(21) Appl. No.: 17/190,080

(22) Filed: Mar. 2, 2021

(65) Prior Publication Data

US 2022/0082832 A1 Mar. 17, 2022

(30) Foreign Application Priority Data

Sep. 16, 2020 (KR) ........................ 10-2020-0119323

(51) Int. Cl.
*G02B 27/01* (2006.01)

(52) U.S. Cl.
CPC .. *G02B 27/0172* (2013.01); *G02B 2027/0105* (2013.01); *G02B 2027/0174* (2013.01)

(58) Field of Classification Search
CPC ........ G02B 27/0172; G02B 2027/0105; G02B 2027/0174; G02B 2027/0118; G02B 5/20;

(Continued)

(56) References Cited

U.S. PATENT DOCUMENTS

| 7,230,583 B2 | 6/2007 | Tidwell et al. |
| 10,444,519 B2 | 10/2019 | Arakawa et al. |

(Continued)

FOREIGN PATENT DOCUMENTS

| JP | 2002-529801 A | 9/2002 |
| JP | 20179986 A | 1/2017 |

(Continued)

OTHER PUBLICATIONS

Shrestha, P., et al., "Accommodation-Free Head Mounted Display with Comfortable 3D Perception and an Enlarged Eye-box", Research: A Science Partner Journal, vol. 2019, Article ID 9273723, Aug. 25, 2019, pp. 1-9.

(Continued)

*Primary Examiner* — Henry Duong
(74) *Attorney, Agent, or Firm* — Sughrue Mion, PLLC

(57) ABSTRACT

An image display device includes a main light source configured to emit a first light; a display panel configured to modulate the first light to add image information to the first light; a holographic optical element (HOE) configured to diffract the first light emitted from the display panel to make the first light travel to a first region to generate a main image; a first optical system provided on a traveling path of the first light between the main light source and the HOE, the first optical system being configured to change the traveling path of the first light to be incident on the HOE along a first path; an auxiliary light source configured to emit a second light; and a second optical system provided on a traveling path of the second light, the second optical system being configured to change a traveling path of the second light to be incident on the HOE along a second path different from the first path.

23 Claims, 20 Drawing Sheets

(58) Field of Classification Search
CPC .... G03H 1/02; G03H 1/04; G03H 2001/2215; G03H 2222/34; G03H 2223/14; G03H 2223/23; G03H 2223/24; G03H 1/0005; G03H 2001/0077; G03H 2001/0439
USPC .......................................................... 359/15
See application file for complete search history.

(56) References Cited

U.S. PATENT DOCUMENTS

| | | | |
|---|---|---|---|
| 2013/0141527 A1* | 6/2013 | Shimizu | G02B 27/145 348/40 |
| 2017/0123204 A1 | 5/2017 | Sung et al. | |
| 2018/0129054 A1 | 5/2018 | Morrison et al. | |
| 2018/0348525 A1* | 12/2018 | Kadowaki | G02B 27/0172 |
| 2019/0041565 A1 | 2/2019 | Masson et al. | |
| 2020/0236331 A1 | 7/2020 | Greenberg | |
| 2020/0348459 A1 | 11/2020 | Seo et al. | |
| 2021/0165226 A1* | 6/2021 | Ide | G02B 27/0179 |
| 2022/0171112 A1* | 6/2022 | Nakano | G02B 27/0172 |

FOREIGN PATENT DOCUMENTS

| | | |
|---|---|---|
| KR | 10-2017-0049358 A | 5/2017 |
| KR | 1020180091028 A | 8/2018 |
| KR | 10-2019-0099721 A | 8/2019 |

OTHER PUBLICATIONS

Communication dated Sep. 25, 2024, issued by the Korean Intellectual Property Office in Koream Application No. 10-2020-0119323.

* cited by examiner

IMAGE DISPLAY DEVICE AND AUGMENTED REALITY DEVICE INCLUDING THE SAME

CROSS-REFERENCE TO RELATED APPLICATION

This application is based on and claims priority under 35 U.S.C. § 119 to Korean Patent Application No. 10-2020-0119323, filed on Sep. 16, 2020, in the Korean Intellectual Property Office, the disclosure of which is incorporated by reference herein in its entirety.

BACKGROUND

1. Field

Example embodiments consistent with the present disclosure relate to image display devices and augmented reality devices including the same.

2. Description of Related Art

Recently, there have been increasing demands for augmented reality (AR) glasses, which are AR devices that allow users to visually recognize desired virtual images while seeing an outside scenery.

AR glasses include a combiner that allows a user to see an image generated by a particular signal and an outside scenery. The combiner includes a beam splitter (BS) or a holographic optical element (HOE).

In general, a device in which a BS and an optical system including a lens and a mirror are combined is widely used as a combiner. However, when such a type of combiner is used, as a viewing angle increases, the volume of the BS and the size of the optical system also increase.

Recently, research has been conducted on using an HOE capable of implementing complex optical characteristics in a simple form as a combiner. A combiner using such an HOE is manufactured to function as a concave mirror such that an image is directly focused on a viewer's eyes to allow a viewer to view the image. The method of focusing the image directly on the viewer's eyes is referred to as retinal projection.

In this case, an eye box formed through a retinal projection method using an HOE is very small. In other words, when the HOE is used as the combiner, a region on which the image is focused is very small. An accurate image may be viewed only when the eye is accurately positioned in a very small region on which the image is focused, but it is difficult for a general viewer to find the region on which the image is focused.

SUMMARY

Example embodiments provide image display devices forming a guide image surrounding an eye box and augmented reality (AR) devices including the same.

Additional aspects will be set forth in part in the description which follows and, in part, will be apparent from the description, or may be learned by practice of the presented embodiments of the disclosure.

According to an aspect of an example embodiment, there is provided an image display device including: a main light source configured to emit a first light; a display panel configured to modulate the first light to add image information to the first light; a holographic optical element (HOE) configured to diffract the first light emitted from the display panel to make the first light travel to a first region to generate a main image; a first optical system provided on a traveling path of the first light between the main light source and the HOE, the first optical system being configured to change the traveling path of the first light to be incident on the HOE along a first path; an auxiliary light source configured to emit a second light; and a second optical system provided on a traveling path of the second light, the second optical system being configured to change a traveling path of the second light to be incident on the HOE along a second path different from the first path, wherein the HOE is further configured to diffract the second light incident through the second path to make the second light travel toward a second region surrounding the first region to generate a guide image surrounding the main image.

The HOE may include an interference pattern formed by a reference light incident along the first path and a signal light incident along a third path different from the first path.

The first optical system may include at least one lens.

The display panel may be provided on the traveling path of the first light between the first optical system and the HOE and is configured to change and direct the traveling path of the first light emitted from the main light source and passing through the first optical system to the HOE along the first path.

The second optical system may be provided on the traveling path of the second light between the auxiliary light source and the display panel to direct the second light to the display panel, and the display panel may be further configured to change and direct the traveling path of the second light emitted from the auxiliary light source and passing through the second optical system to the HOE along the second path.

The second optical system may include at least one lens and at least one auxiliary mirror configured to change the traveling path of the second light.

The second optical system may include at least one lens configured to change the traveling path of the second light, and a beam splitter configured to reflect and direct the second light passing through the at least one lens to the display panel, and the beam splitter may be further configured to transmit and direct the first light passing through the first optical system to the display panel.

The image display device may further include a driving device configured to change a position of the at least one lens to change a distance between the at least one lens and the beam splitter.

The display panel may be provided on the traveling path of the first light between the main light source and the first optical system and may be configured to change and direct the traveling path of the first light emitted from the main light source to the first optical system, and the image display device may further include a first main mirror provided on the traveling path of the first light between the first optical system and the HOE and configured to reflect and direct the first light modulated by the display panel and passing through the first optical system to the HOE.

The second optical system may be provided on the traveling path of the second light between the auxiliary light source and the first main mirror, the second optical system may be configured to change and direct the traveling path of the second light to the first main mirror, and the first main mirror may be further configured to reflect and direct the second light emitted from the auxiliary light source and passing through the second optical system to the HOE.

The second optical system may include: at least one lens configured to change the traveling path of the second light; and a beam splitter configured to reflect and direct the second light passing through the at least one lens to the first main mirror and transmit and direct the first light passing through the first optical system to the first main mirror.

The image display device may further include a driving device configured to change a position of the at least one lens to change a distance between the at least one lens and the beam splitter.

The second optical system may be provided on the traveling path of the second light between the auxiliary light source and the display panel to change and direct the traveling path of the second light to the display panel, and the first main mirror may be further configured to reflect and direct the second light emitted from the auxiliary light source and sequentially passing through the second optical system, the display panel, and the first optical system to the HOE.

The second optical system may include a beam splitter configured to reflect and direct the second light to the display panel and transmit and direct the first light emitted from the main light source to the display panel.

The second optical system may include at least one lens provided between the beam splitter and the auxiliary light source and configured to change and direct the traveling path of the second light to the beam splitter.

The image display device may further include a driving device configured to change a position of the auxiliary light source to change a distance between the auxiliary light source and the beam splitter.

The image display device may further include a second main mirror provided on the traveling path of the first light between the display panel and the first optical system, the second main mirror being configured to change and direct the traveling path of the first light from the display panel to the first optical system.

The image display device may further include a collimating lens provided on the traveling path of the first light between the main light source and the display panel, the collimating lens being configured to collimate the first light.

The image display device may further include an optical filter provided on the traveling path of the first light between the first main mirror and the first optical system, the optical filter being configured to transmit therethrough a part of the first light passing through the first optical system.

The optical filter may include a first hole formed in a center thereof.

The optical filter further may include an annular second hole surrounding the first hole, and a center of the annular second hole is positioned at the center of the optical filter.

The optical filter further may include a plurality of third holes surrounding the first hole and spaced apart from each other.

The optical filter further may include an annular light transmission-blocking film surrounding the first hole, the light transmission-blocking film transmitting or blocking light according to an electric signal applied thereto, and a center of the light transmission-blocking film is positioned at the center of the optical filter.

The first light emitted from the main light source may include coherent light.

According to an aspect of an example embodiment, there is provided an image display device including: a main light source configured to emit a light; a driving device configured to change a position of the main light source to a first position or a second position; a display panel configured to modulate the light to add image information to the light; a holographic optical element (HOE) configured to diffract the light from the display panel; and a first optical system provided on a traveling path of the light, the first optical system being configured to change the traveling path of the light to be incident on the HOE, wherein, when the main light source is disposed at the first position, the first optical system is configured to change the traveling path of the light to be incident on the HOE along a first path, and when the main light source is disposed at the second position, the first optical system is configured to change the traveling path of the light to be incident on the HOE along a second path different from the first path, and wherein the HOE is configured to diffract the light incident along the first path to make the light incident along the first path travel toward a first region to generate a main image and diffract the light incident along the second path to make the light incident along the second path travel toward a second region surrounding the first region to generate a guide image surrounding the main image.

The HOE may include an interference pattern formed by a reference light incident along the first path and a signal light incident along a third path different from the first path.

The first optical system may include at least one lens.

The display panel may be provided on the traveling path of the light between the first optical system and the HOE and may be configured to change and direct the traveling path of the light emitted from the main light source and passing through the first optical system to the HOE.

The image display device may further include an optical filter provided on the traveling path of the light between the first optical system and the display panel, the optical filter being configured to transmit a part of the light passing through the first optical system.

The optical filter may include a first hole formed in a center thereof and an annular second hole surrounding the first hole, and a center of the annular second hole is positioned at the center of the optical filter.

The display panel may be provided on the traveling path of the light between the main light source and the first optical system and may be configured to change and direct the traveling path of the light emitted from the main light source to the first optical system, and the image display device may further include a first main mirror provided on the traveling path of the light between the first optical system and the HOE, the first main mirror being configured to reflect and direct the light modulated by the display panel and passing through the first optical system to the HOE.

The image display device may further include a second main mirror provided on the traveling path of the light between the display panel and the first optical system, the second main mirror being configured to change and direct the traveling path of the light from the display panel to the first optical system.

The image display device may further include a collimating lens provided on the traveling path of the light between the main light source and the display panel, the collimating lens being configured to collimate the light.

The image display device may further include an optical filter provided on the traveling path of the light between the first main mirror and the first optical system, the optical filter being configured to transmit a part of the light passing through the first optical system.

The optical filter may include a first hole formed in a center thereof and an annular second hole surrounding the first hole, and a center of the annular second hole is positioned at the center of the optical filter.

According to an aspect of an example embodiment, there is provided an image display device including: a main light source configured to emit a light; a collimating lens configured to collimate the light; a driving device configured to change the collimating lens to a first state or a second state; a display panel configured to modulate the light passing through the collimating lens to add image information to the light; a holographic optical element (HOE) configured to diffract the light from the display panel; and a first optical system provided on a traveling path of the light and configured to change the traveling path of the light to be incident on the HOE, wherein, when the collimating lens is in the first state, the first optical system is configured to change the traveling path of the light to be incident on the HOE along a first path, and when the collimating lens is in the second state, the first optical system is configured to change the traveling path of the light to be incident on the HOE along a second path different from the first path, and wherein the HOE is configured to diffract the light incident along the first path to make the light incident along the first path travel toward a first region to generate a main image and diffract the light incident along the second path to make the light incident along the second path travel toward a second region surrounding the first region to generate a guide image surrounding the main image.

The collimating lens may be provided at a first position in the first state, and the collimating lens may be provided at a second position different from the first position in the second state.

The collimating lens may have a first refractive power in the first state, the collimating lens may have a second refractive power in the second state, and second refractive power is different from the first refractive power.

According to an aspect of an example embodiment, there is provided image display device including: a main light source configured to emit a first light; a display panel configured to modulate the first light to add image information to the first light; a holographic optical element (HOE) configured to diffract the first light from the display panel to make the first light travel to a first region to generate a main image; a first optical system provided on a traveling path of the first light between the main light source and the HOE, the first optical system being configured to change the traveling path of the first light to be incident on the HOE along a first path; an optical filter provided on the traveling path of the first light between the first optical system and the HOE, the optical filter being configured to transmit a part of the first light passing through the first optical system; and an auxiliary light source provided on the optical filter and configured to emit a second light, wherein the HOE is configured to diffract the second light from the auxiliary light source incident along a second path different from the first path to make the second light travel toward a second region surrounding the first region to generate a guide image surrounding the main image.

The display panel may be provided on the traveling path of the first light between the first optical system and the HOE, and the display panel may be configured to change and direct the traveling path of the first light emitted from the main light source and passing through the first optical system to the HOE, and change and direct a traveling path of the second light emitted from the auxiliary light source to the HOE.

According to an aspect of an example embodiment, there is provided augmented reality (AR) device including the image display device and configured as a wearable device.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
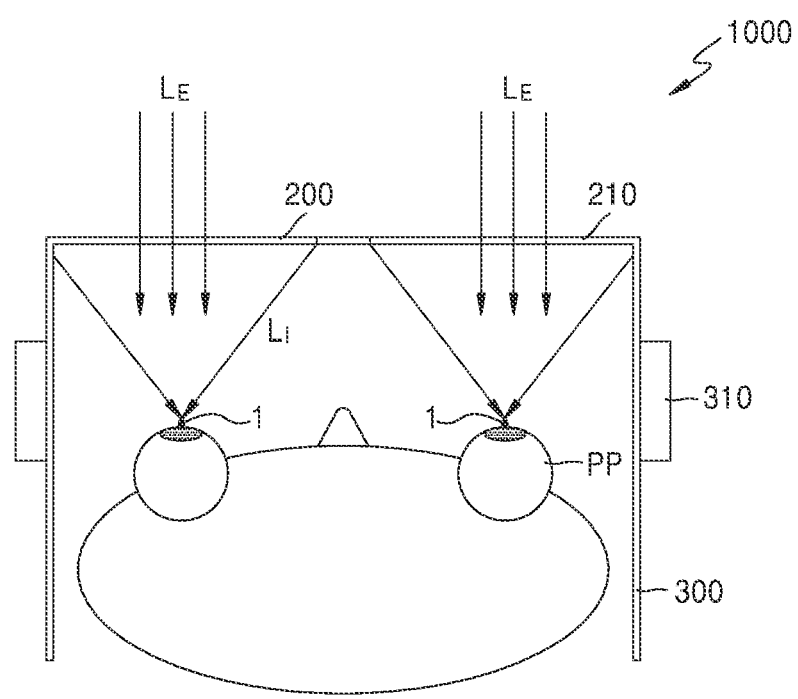
FIG. 1 is a schematic diagram illustrating an eye box formed by an augmented reality (AR) device according to a comparative example.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an image display device and an augmented reality (AR) device including the same according to example embodiments will be described in detail with reference to the accompanying drawings. In the drawings, like reference numerals refer to like elements throughout, and sizes or thicknesses of elements may be exaggerated for clarity and convenience of explanation. Meanwhile, the example embodiments described below are merely exemplary, and various modifications may be made therefrom.

As used herein, the term "on" or "above" an element may be understood to mean that the element may be directly on another element or be on another element not in contact with the other element. As used herein, the singular expressions are intended to include plural forms as well, unless the context clearly dictates otherwise. It will be understood that when an element is referred to as "including" another element, the element may further include other elements unless mentioned otherwise.

The term "the" and demonstratives similar thereto may be understood to include both singular and plural forms. Operations of a method may be performed in an appropriate order unless explicitly stated or contradicted to the order of the operations. It is not necessarily limited to the order of description of the operations.

It will be understood that, although the terms "first", "second", etc. may be used herein to describe various elements, these elements should not be limited by these terms. These terms are only used to distinguish one element from another. The image display device and the augmented reality device including the same may be realized in various different ways, and the descriptions of example embodiments are not limited thereto.

Figure 2:
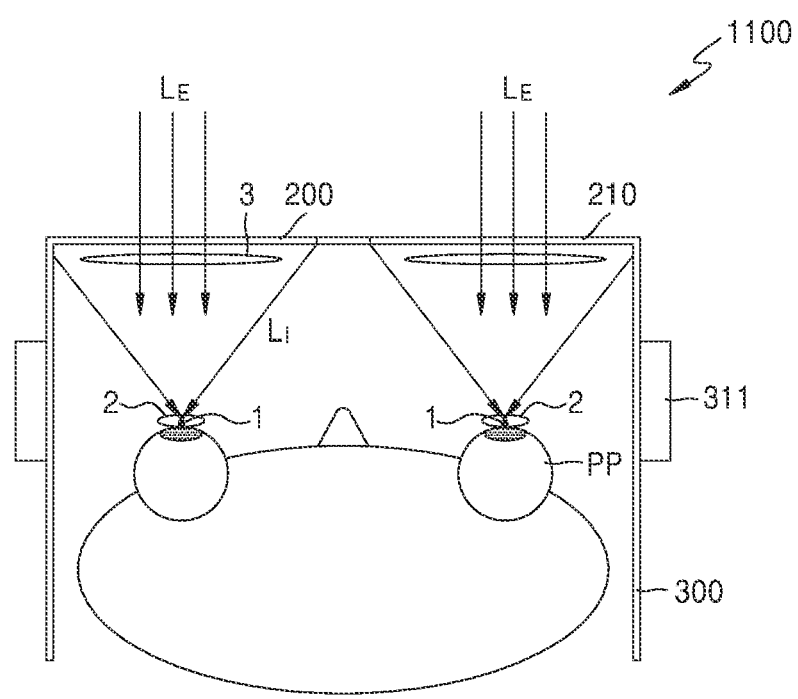
FIG. 2 is a schematic diagram illustrating an eye box formed by an AR device according to an example embodiment.

FIG. 1 is a schematic diagram illustrating an eye box formed by an augmented reality (AR) device 1000 according to a comparative example. FIG. 2 is a schematic diagram illustrating an eye box formed by an AR device 1100 according to an example embodiment. The AR devices 1000 and 1100 of FIGS. 1 and 2 may be configured as wearable devices. For example, the AR devices 1000 and 1100 of FIGS. 1 and 2 may be AR glasses.

Referring to FIG. 1, the AR device 1000 according to a comparative example may include a body 200 and a leg portion 300. The body 200 may be provided at a position corresponding to the front of a viewer's eyeballs PP. The leg portion 300 may be a contact member for wearing the AR device 1000 on a viewer's face. The leg portions 300 may be provided at positions corresponding to the left and right of the viewer. A combiner 210 that combines an external light $L_E$ and an internal light $L_I$ may be mounted on the front surface of the body 200 facing the viewer's eyeballs PP. An image generating device 310 may be mounted on the leg portion 300. However, the disclosure is not limited thereto, and the image generating device 310 may be mounted on the body 200 according to design.

For example, the combiner 210 may include a holographic optical element (HOE). The combiner 210 may transmit therethrough the external light $L_E$ from an external image and transfer the external light $L_E$ to the viewer's eyeballs PP. In addition, at the same time, the combiner 210 may change a traveling direction of the internal light $L_I$ from the image generating device 310 provided in the leg portion 300 and transfer the internal light $L_I$ to the viewer's eyeballs PP. Accordingly, the viewer may recognize an image in which an actual external image generated by the external light $L_E$ and a virtual image generated by the internal light $L_I$ are combined.

However, the combiner 210 which is the HOE may focus the internal light $L_I$ from the image generating device 310 on the viewer's eyeballs PP. This virtual image generating method is called retinal projection. In this case, the virtual image may be focused on a very small first region 1. In order to recognize the virtual image, the viewer needs to position the eyeballs PP to correspond to the first region 1. However, it may be difficult for a general viewer to find where the virtual image is focused.

Referring to FIG. 2, the AR device 1100 according to an example embodiment differs from the AR device 1000 according to the comparative example of FIG. 1 in that a function of an image generating device 311 mounted on the leg portion 300 is different from that of the image generating device 310 of FIG. 1. The AR device of FIG. 2 may include any one of image generating devices 100, 101, 102, 103, 104, 105, 106, 107, 108, 109, and 110 that will be described later.

The combiner 210 which is a HOE of FIG. 2 may generate a virtual image by focusing a part of the internal light $L_I$ from the image generating device 311 on the very small first region 1. At the same time, the combiner 210 may generate a first guide image by focusing another part of the internal light $L_I$ from the image generating device 311 on a second region 2 surrounding the first region 1. Further, according to the design, the combiner 210 may generate a second guide image by directing another part of the internal light $L_I$ from the image generating device 311 to a third region 3 formed closer to the combiner 210 than the first region 1 and including an area larger than the first region 1.

As described above, the combiner 210 and the image generating device 311 may generate the first and second guide images by directing a part of the internal light $L_I$ to the second region 2 surrounding the first region 1 and the third region 3 formed closer to the combiner 210 than the first region 1. The first and second guide images may be formed to have a larger area than that of the virtual image. Accordingly, the viewer may identify a position on which the virtual image is approximately focused through the better recognized first and second guide images. Hereinafter, the virtual image is referred to as a main image, and the combiner 210 which is the HOE and the image generating device 311 may be collectively referred to as an "image display device". Hereinafter, a principle in which the image display device generates the main image and the guide image and various example embodiments will be described in detail with reference to FIGS. 3 to 20.

Meanwhile, in FIG. 2, it has been described that the AR device 1100 according to an example embodiment is AR glasses, but the disclosure is not limited thereto. The AR device 1100 may be various types of AR device 1100 including the image display device that generates the guide image guiding a position of the main image.

Figure 3:
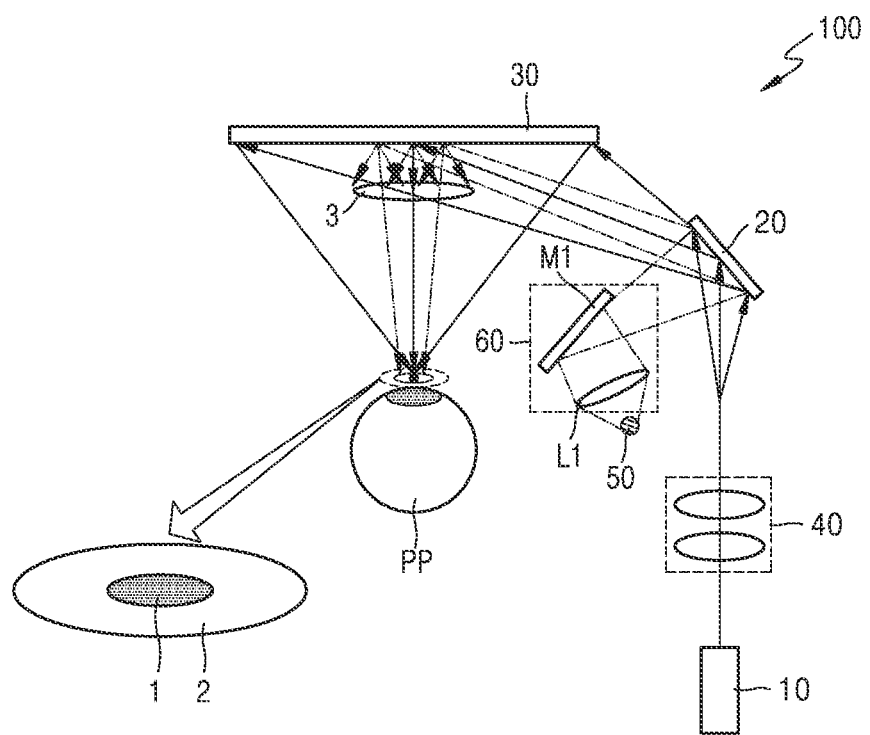
FIG. 3 is a schematic diagram illustrating a configuration of an image display device according to an example embodiment.
Figure 4:
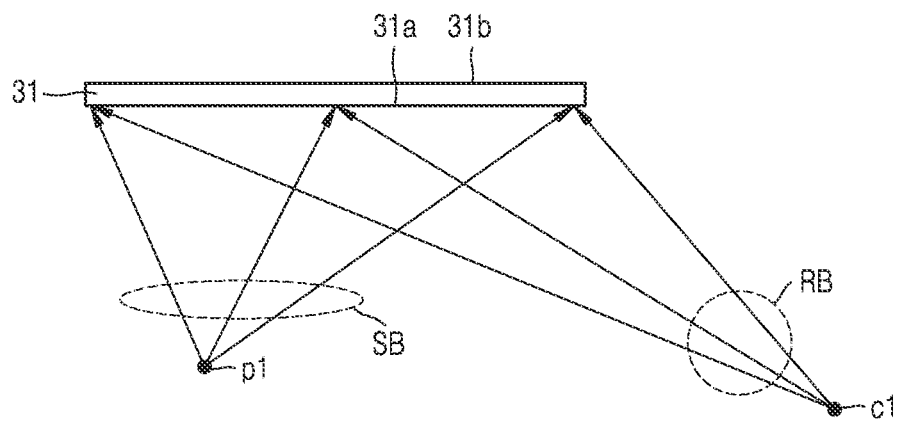
FIG. 4 is a schematic diagram illustrating a method of manufacturing a holographic optical element (HOE) of FIG. 3.

FIG. 3 is a schematic diagram illustrating a configuration of an image display device 100 according to an example embodiment. FIG. 4 is a schematic diagram illustrating a method of manufacturing a HOE 30 of FIG. 3.

Referring to FIG. 3, the image display device 100 may include a main light source 10 that emits a first light, a display panel 20 that modulates the first light to add image information to the first light, the HOE 30 that diffracts the first light from the display panel 20 to make the first light travel to the first region 1 and generates a main image, a first optical system 40 provided on a traveling path of the first light between the main light source 10 and the HOE 30 and configured to change the traveling path of the first light such that the first light is incident on the HOE 30 along a first path, an auxiliary light source 50 emitting a second light, and a second optical system 60 provided on a traveling path of the second light and configured to change the traveling path of the second light such that the second light is incident on the HOE 30 along a second path different from the first path. In FIG. 3, the traveling path of the first light is indicated by a solid line, and the traveling path of the second light is indicated by a dotted line.

The main light source 10 may emit the first light used to generate the main image to be provided to a viewer. The main light source 10 may emit coherent first light. For example, the main light source 10 may include a laser diode (LD) that emits a laser beam.

The display panel 20 may include, for example, an optical electrical device capable of changing a refractive index according to an electrical signal. The display panel 20 may include, for example, an optical electrical material layer such as a liquid crystal layer. The display panel 20 may control an amplitude, a phase, and a wavelength of light emitted by changing a refractive index when a voltage is applied to the optical electrical material layer. The display panel 20 may receive an image signal from a processor and modulate at least one of an amplitude, a phase, and a wavelength of an incident light according to the image signal. For example, the display panel 20 may include a liquid crystal on silicon (LCoS) device. However, the disclosure is not limited thereto, and the display panel 20 may include any device capable of generating image information by modulating the incident light.

The HOE 30 may include a certain interference pattern. Referring to FIG. 4, the certain interference pattern generated due to interference between a coherent reference beam RB and a coherent signal beam SB is formed on a transparent photosensitive film 31, and thus the HOE 30 may be manufactured. For example, the HOE 30 may be manufactured by mounting the photosensitive film 31 including the certain interference pattern on a glass substrate.

As shown in FIG. 4, the photosensitive film 31 may include a first surface 31a and a second surface 31b facing (i.e., opposite to) the first surface 31a. The reference beam RB and the signal beam SB may be irradiated onto the photosensitive film 31. For example, a plurality of reference beams RB diverged from a first point c1 and a plurality of signal beams SB diverged from a second point p1 may be irradiated toward a first surface 31a. Accordingly, the certain interference pattern formed due to the interference between the reference beam RB and the signal beam SB may be formed on the first surface 31a. In this case, a traveling path of the plurality of reference beams RB diverged from the first point c1 may be a third path, and a traveling path of the plurality of signal beams SB diverged from the second point p1 may be a fourth path.

When the first light is irradiated onto the HOE 30 manufactured as above along the third path, the first light may be diffracted by the HOE 30 to travel toward the second point p1 along the fourth path. When the first light having image information added by the display panel 20 is incident on the HOE 30, the first light may be focused on the second point p1, and accordingly, the main image may be formed on the second point p1. The second point p1 may correspond to the first region 1 of FIG. 3. In this case, the third path may be the same as the first path.

In contrast, when the second light is irradiated onto the HOE 30 along the second path different from the third path, the second light may be diffracted by the HOE 30 to travel toward another region around the second point p1 other than the second point p1. In this case, when the second path is appropriately adjusted, the HOE 30 may make the second light travel toward a region (e.g., the second region 2 of FIG. 3) surrounding the second point p1. A guide image surrounding the main image may be generated by the second light traveling toward the region surrounding the second point p1.

Meanwhile, the second path may be a path through which the second light converges with respect to the HOE 30. As described above, the second light incident on the HOE 30 along the converging second path may be scattered from the surface of the HOE 30 to have sufficient intensity to form another guide image on the third region 3 adjacent to the HOE 30.

As described above, the main image may be generated on the first region 1 by using the first light irradiated along the first path identical to the third path to the HOE 30, and the guide image surrounding the main image may be generated on the second region 2 by using the second light irradiated along the second path. In addition, as shown in FIG. 3, another guide image may be generated on the third region 3 adjacent to the HOE 30 by using a part of the second light scattered and irradiated along the converging second path with respect to the HOE 30. As such, the first path of the first light for generating the main image positioned on the first region 1 may be implemented by properly designing the first optical system 40, and the second path of the second light for generating the guide image positioned on the second region 2 and the third region 3 may be implemented by properly designing a second optical system 60.

The first optical system 40 may include at least one lens. For example, the first optical system 40 may include a plurality of lenses. By adjusting the refractive power and focal length of at least one lens included in the first optical system 40, the traveling path of the first light passing through the first optical system 40 may change, and thus finally, the first light may be incident on the HOE 30 along the appropriate first path. In FIG. 3, the first optical system 40 includes two convex lenses, but is not limited thereto. The number, size and type of the at least one lens included in the first optical system 40 are not particularly limited. Furthermore, according to design, the first optical system 40 may further include at least one mirror.

The auxiliary light source 50 may emit the second light used to generate the guide image provided to the viewer. The auxiliary light source 50 may emit coherent second light. However, the present disclosure is not limited thereto, and the second light may not have coherence. Because the first light needs to be diffracted with high efficiency by the interference pattern included in the HOE 30 in order to be accurately focused on the first region 1, the first light needs to be a coherent light similar to the reference beam RB used to manufacture the HOE 30. However, because the second light does not necessarily need to be accurately focused on the first region 1, the second light may not need to be diffracted with high efficiency by the interference pattern included in the HOE 30. When the second light has coherence, the guide image formed on the second region 2 may be generated more efficiently, but even when the second light does not have coherence, the guide image may be generated on the second region 2. Therefore, the second light from the auxiliary light source 50 may not necessarily be coherent light. For example, the auxiliary light source 50 may include a laser diode (LD) that emits a laser beam. However, the auxiliary light source 50 is not limited thereto and may include, for example, an LED element.

The second optical system 60 may include at least one lens L1 and at least one auxiliary mirror M1 changing the traveling path of the second light emitted from the auxiliary light source 50. For example, the at least one lens L1 may include a convex lens. In this case, the at least one lens L1 from the auxiliary light source 50 may refract and direct the second light to a certain region. The at least one auxiliary mirror M1 may change the traveling direction of the second light passing through (i.e., that has passed through) the at least one lens L1 to be directed to the display panel 20. As described above, the traveling path of the second light emitted from the auxiliary light source 50 may be changed by the second optical system 60. The traveling path of the second light may change once again by the display panel 20 and finally be incident on the HOE 30 along the second path. In FIG. 3, the at least one lens L1 and the at least one auxiliary mirror M1 are illustrated, but these are only for convenience of description. For example, the second optical system 60 may include a plurality of lenses and a plurality of mirrors.

As shown in FIG. 3, the display panel 20 may be provided on the traveling path of the first light between the first optical system 40 and the HOE 30. Also, the display panel 20 may add image information to the first light by modulating the first light emitted from the main light source 10 that has passed through the first optical system 40. Furthermore, the display panel 20 may change the traveling direction of the first light including the image information to be directed to the HOE 30. In this case, the traveling path of the first light that travels along the traveling path already determined by the first optical system 40 may change once again such that the first light is incident on the HOE 30 along the first path.

As shown in FIG. 3, the second optical system 60 may be provided on the traveling path of the second light between the auxiliary light source 50 and the display panel 20. Also, the second optical system 60 may change the traveling path of the second light to be directed to the display panel 20. In this case, the traveling path of the second light that travels along the traveling path already determined by the second optical system 60 may change such that the second light is incident on the HOE 30 along the second path.

As described above, the first light having the image information emitted from the main light source 10, modulated by the display panel 20 and incident on the HOE 30 along the first path may be diffracted by the HOE 30 and travel toward the first region 1. In addition, the second light emitted from the auxiliary light source 50 and incident on the HOE 30 along the second path may be diffracted by the HOE 30 and travel toward the second region 2. Further, a part of the second light incident on the HOE 30 along the second path may be scattered from the surface of the HOE 30 and travel toward the third region 3.

As described above, the main image may be generated by the first light traveling toward the first region 1, and the guide image may be generated by the second light traveling toward the second region 2 and the third region 3.

When the auxiliary light source 50 is in an 'on' state and the main light source 10 is in an 'off' state, only the guide image may be generated. After placing the eyeball PP on the guide image, the viewer may turn off the auxiliary light source 50 and manipulate the main light source 10 in the 'on' state. When the main light source 10 is in the "on" state, the main image may be generated on the first region 1. As describe above, the viewer may view the main image after easily placing the eyeball PP within the second region 2 on which the guide image is generated. The on/off operations of the main light source 10 and the auxiliary light source 50 may be controlled by an eye tracking sensor that senses location information of the viewer's eyeball PP and a separate processor.

Figure 5:
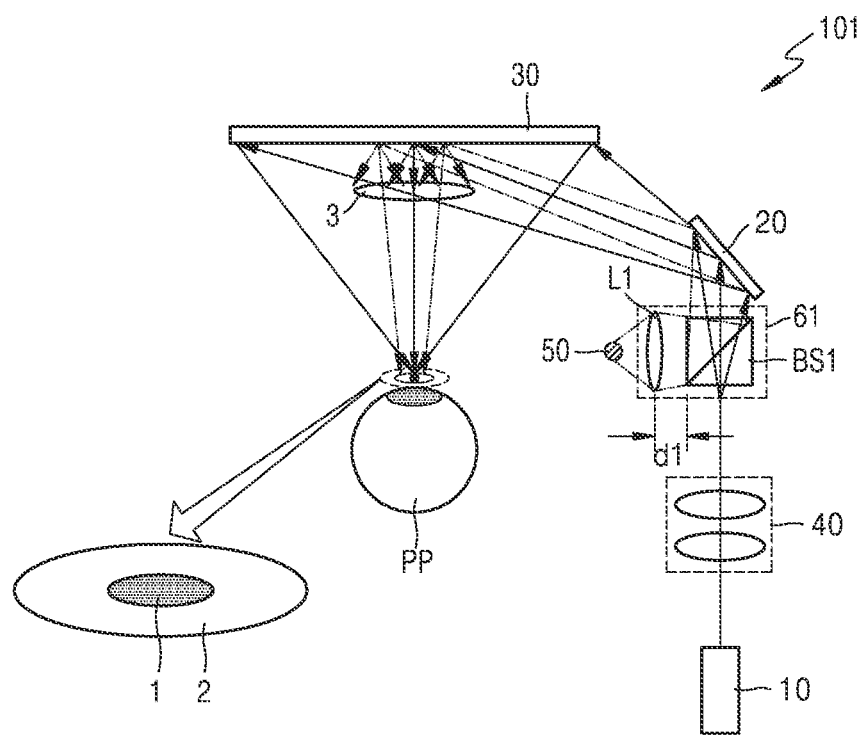
FIG. 5 is a schematic diagram illustrating a configuration of an image display device in a first state according to an example embodiment.
Figure 6:
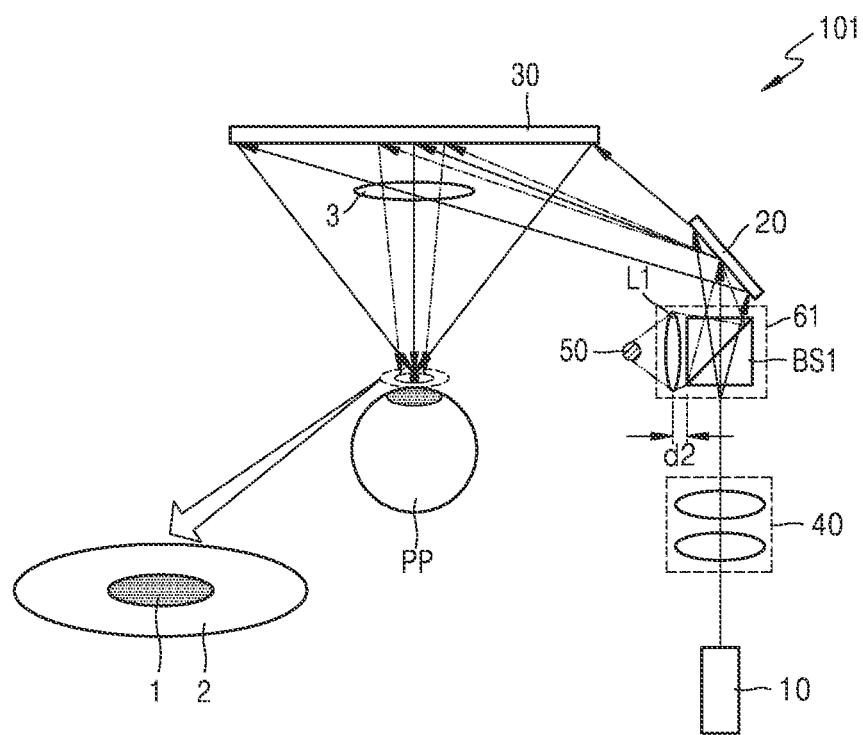
FIG. 6 is a schematic diagram illustrating a configuration of the image display device of FIG. 5 in a second state.

FIG. 5 is a schematic diagram illustrating a configuration of an image display device 101 in a first state according to an example embodiment. FIG. 6 is a schematic diagram illustrating a configuration of the image display device 101 of FIG. 5 in a second state. The image display device 101 of FIGS. 5 and 6 may be substantially the same as the image display device 100 of FIG. 3 except that the configuration of a second optical system 61 is different from that of the second optical system 60 of FIG. 3. In describing FIGS. 5 and 6, descriptions redundant with FIGS. 3 to 4 will be omitted.

Referring to FIGS. 5 and 6, the image display device 100 may include a main light source 10 that emits a first light, the display panel 20 that modulates the first light to add image information to the first light, the HOE 30 that diffracts the first light from the display panel 20 to make the first light travel to the first region 1 and generates a main image, the first optical system 40 provided on a traveling path of the first light between the main light source 10 and the HOE 30 and configured to change the traveling path of the first light such that the first light is incident on the HOE 30 along a first path, the auxiliary light source 50 emitting a second light, and the second optical system 61 provided on a traveling path of the second light and configured to change the traveling path of the second light such that the second light is incident on the HOE 30 along a second path different from the first path. In FIGS. 5 and 6, the traveling path of the first light is indicated by a solid line, and the traveling path of the second light is indicated by a dotted line.

As shown in FIGS. 5 and 6, the second optical system 61 may be provided on the traveling path of the second light between the auxiliary light source 50 and the display panel 20. Also, the second optical system 61 may change the traveling path of the second light to be directed to the display panel 20. In this case, the traveling path of the second light may change once again by interaction with the display panel 20 such that the second light is incident on the HOE 30 along the second path.

The second optical system 61 may include the at least one lens L1 and a beam splitter BS1 changing the traveling path of the second light. The beam splitter BS1 may be provided at a position to reflect and direct the second light that has passed through the at least one lens L1 to the display panel 20 and transmit and direct the first light that has passed through the first optical system 40 to the display panel 20. For example, the beam splitter BS1 may be provided at a point where a first path of the first light and a second path of the second light intersect. A reflective surface may be provided inside the beam splitter BS1 to reflect part of the incident light and transmit the other part. The reflective surface of the beam splitter BS1 may transmit and direct a part of the first light incident along the first path to the display panel 20 and reflect and direct a part of the second light incident along the second path to the display panel 20.

Meanwhile, a distance between the at least one lens L1 and the beam splitter BS1 may be adjusted. Thus, the traveling path of the second light from the auxiliary light source 50 incident from the display panel 20 to the HOE 30 may change.

For example, as shown in FIG. 5, the at least one lens L1 and the beam splitter BS1 may be spaced apart from each other by a first distance d1 such that the image display device 101 may be set in the first state. When the distance between at least one lens L1 and the beam splitter BS1 is set to the first distance d1, the second light from the display panel 20 may be incident on the HOE 30 along a converging path.

In addition, as shown in FIG. 6, the at least one lens L1 and the beam splitter BS1 may be spaced apart from each other by a second distance d2 such that the image display device 101 may be set in the second state. When the distance between the at least one lens L1 and the beam splitter BS1 is set to the second distance d2, the second light from the display panel 20 may be incident on the HOE 30 along a diverging path.

As described above, to adjust the spaced distance between the at least one lens L1 and the beam splitter BS1, the image display device 101 may further include a driving device that changes a position of the at least one lens L1.

In the image display device 101 in the first state shown in FIG. 5, because the second light from the display panel 20 is incident on the HOE 30 along the converging path, the guide image may be generated on the third region 3 by scattering of a part of the second light. Meanwhile, in the image display device 101 in the second state shown in FIG. 6, because the second light from the display panel 20 is incident on the HOE 30 along the diverging path, the scattering of the second light may be relatively minimized, and accordingly, the guide image may appear clearly in the second region 2. However, the guide image may be generated on the third region 3 even in the second state with lower resolution than in the first state.

Figure 7:
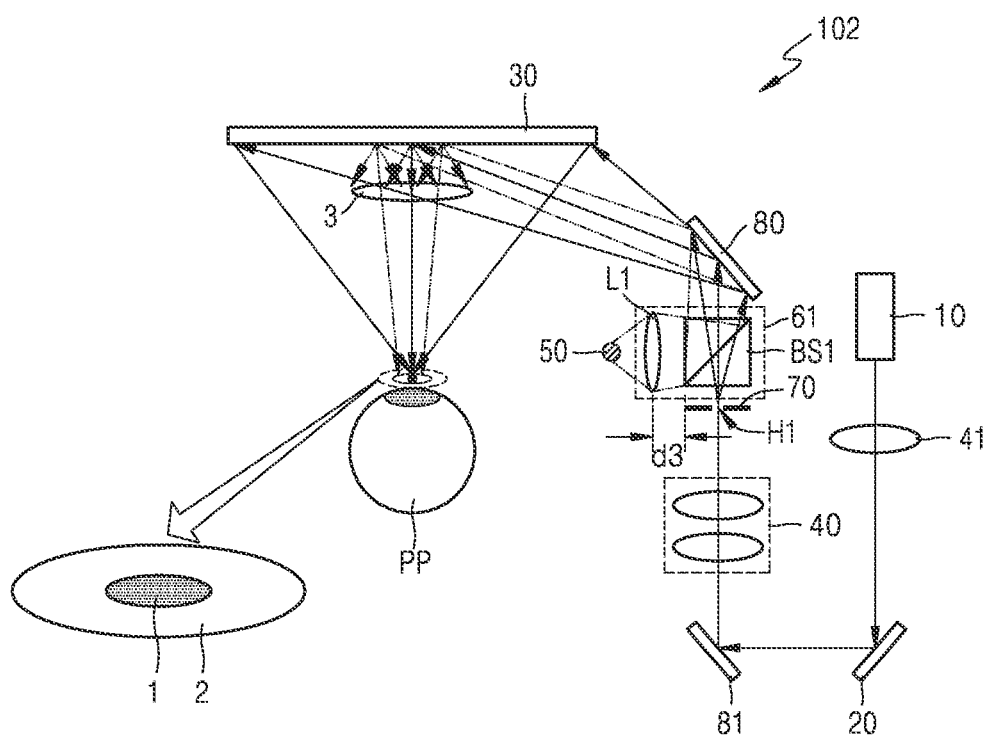
FIG. 7 is a schematic diagram illustrating a configuration of an image display device according to an example embodiment.
Figure 8:
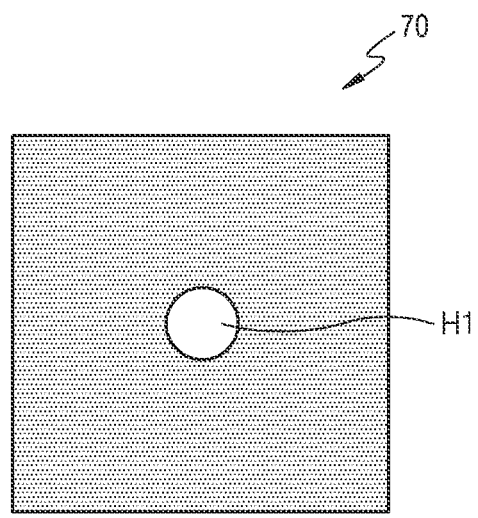
FIG. 8 is a schematic diagram illustrating a configuration of an optical filter included in the image display device of FIG. 7.

FIG. 7 is a schematic diagram illustrating a configuration of an image display device 102 according to an example embodiment. FIG. 8 is a schematic diagram illustrating a configuration of an optical filter 70 included in the image display device 102 of FIG. 7. The image display device 102 of FIG. 7 may be substantially the same as the image display device 101 of FIGS. 5 and 6 except that the image display device 102 of FIG. 7 further includes a collimating lens 41, the optical filter 70, a first main mirror 80, and a second main mirror 81 and that a position of the display panel 20 changes. In describing FIG. 7, descriptions redundant with FIGS. 3 to 6 will be omitted.

Referring to FIG. 7, the image display device 102 may include a main light source 10 that emits a first light, the display panel 20 that modulates the first light to add image information to the first light, the HOE 30 that diffracts the first light from the display panel 20 to make the first light travel to the first region 1 and generates a main image, the first optical system 40 provided on a traveling path of the first light between the main light source 10 and the HOE 30 and configured to change the traveling path of the first light such that the first light is incident on the HOE 30 along a first path, the auxiliary light source 50 emitting a second light, and the second optical system 61 provided on a traveling path of the second light and configured to change the traveling path of the second light such that the second light is incident on the HOE 30 along a second path different from the first path. In FIG. 7, the traveling path of the first light is indicated by a solid line, and the traveling path of the second light is indicated by a dotted line.

As shown in FIG. 7, the display panel 20 may be provided on the traveling path of the first light between the main light source 10 and the first optical system 40. Also, the display panel 20 may add image information to the first light by modulating the first light emitted from the main light source 10. Furthermore, the display panel 20 may change and direct the traveling path of the first light emitted from the main light source 10 to the first optical system 40.

In addition, the image display device 102 may further include a second main mirror 81 provided on the traveling path of the first light between the display panel 20 and the first optical system 40. In this case, the second main mirror 81 may change and direct the traveling path of the first light from the display panel 20 to the first optical system 40. However, the present disclosure is not limited thereto, and positions of the display panel 20 and the second main mirror 81 may be switched. In this case, the first light emitted from the main light source 10 may be reflected by the second main mirror 81 and may then be incident on the display panel 20.

Furthermore, the image display device 102 may further include a collimating lens 41 provided on the traveling path of the first light between the main light source 10 and the display panel 20. The collimating lens 41 may collimate the first light emitted from the main light source 10.

Meanwhile, the image display device 102 may further include a first main mirror 80 provided on the traveling path of the first light between the first optical system 40 and the HOE 30. The first main mirror 80 may reflect and direct the first light modulated by the display panel 20 that has passed through the first optical system 40 to the HOE 30. In this case, the traveling path of the first light that travels along the traveling path already determined by the first main mirror 80 may change once again such that the first light is incident on the HOE 30 along the first path.

Furthermore, the image display device 102 may further include the optical filter 70 provided on the traveling path of the first light between the first main mirror 80 and the first optical system 40. The optical filter 70 may transmit therethrough a part of the first light passing through the first optical system 40 and block the other part of the first light. Referring to FIG. 8, the optical filter 70 may include a first hole H1 formed in the center. In the part of the first light passing through the first optical system 40, light directed to the first hole H1 may pass through the optical filter 70. The other part of the first light may be blocked by a region other than the first hole H1 of the optical filter 70.

As shown in FIG. 7, the second optical system 61 may be provided on the traveling path of the second light between the auxiliary light source 50 and the first main mirror 80. In addition, the second optical system 61 may change and direct the traveling path of the second light to the first main mirror 80. In this case, the traveling path of the second light that travels along the traveling path already determined by the second optical system 61 may change once again such that the second light is incident on the HOE 30 along the second path.

The second optical system 61 may include the at least one lens L1 and the beam splitter BS1 changing the traveling path of the second light. The beam splitter BS1 may be provided at a position to reflect and direct the second light that has passed through the at least one lens L1 to the first main mirror 80 and transmit and direct the first light that has passed through the first optical system 40 to the first main mirror 80. For example, the beam splitter BS1 may be provided at a point where a first path of the first light and a second path of the second light intersect.

Meanwhile, a spaced distance d3 between the at least one lens L1 and the beam splitter BS1 may be adjusted. To this end, the image display device 102 may further include a driving device changing a position of the at least one lens L1 such that the spaced distance d3 between the at least one lens L1 and the beam splitter BS1 may change.

As described above, the first light having the image information emitted from the main light source 10, modulated by the display panel 20 and incident on the HOE 30 along the first path may be diffracted by the HOE 30 and travel toward the first region 1. In addition, the second light emitted from the auxiliary light source 50 and incident on the HOE 30 along the second path may be diffracted by the HOE 30 and travel toward the second region 2. Further, a part of the second light incident on the HOE 30 along the second path may be scattered from the surface of the HOE 30 and travel toward the third region 3.

Figure 9:
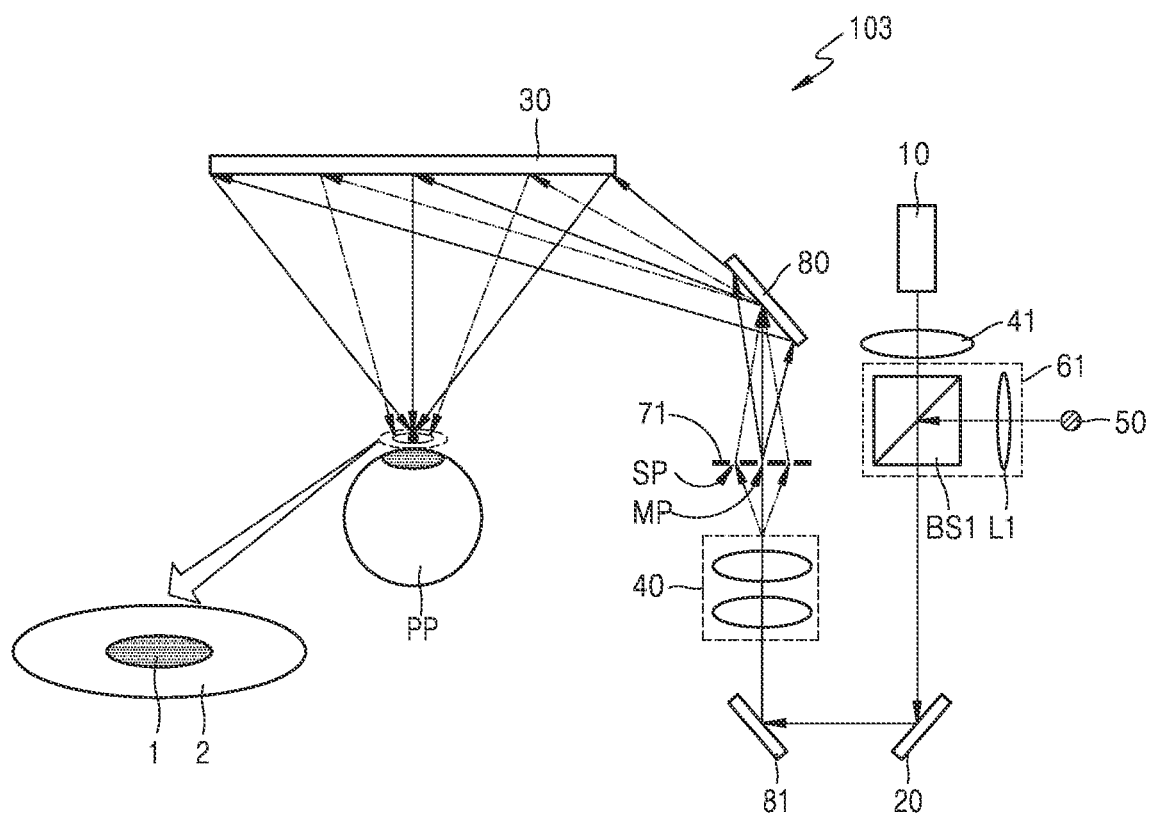
FIG. 9 is a schematic diagram illustrating a configuration of an image display device according to an example embodiment.
Figure 10:
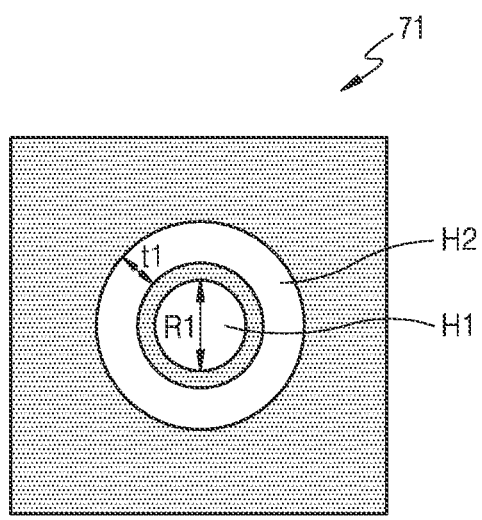
FIG. 10 is a schematic diagram illustrating a configuration of an optical filter included in the image display device of FIG. 9.
Figure 11:
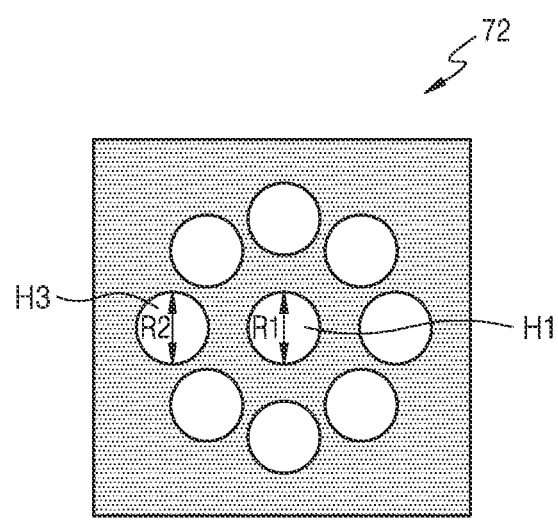
FIG. 11 is a schematic diagram illustrating a configuration of an optical filter that may be applied to the image display device of FIG. 9.
Figure 12:
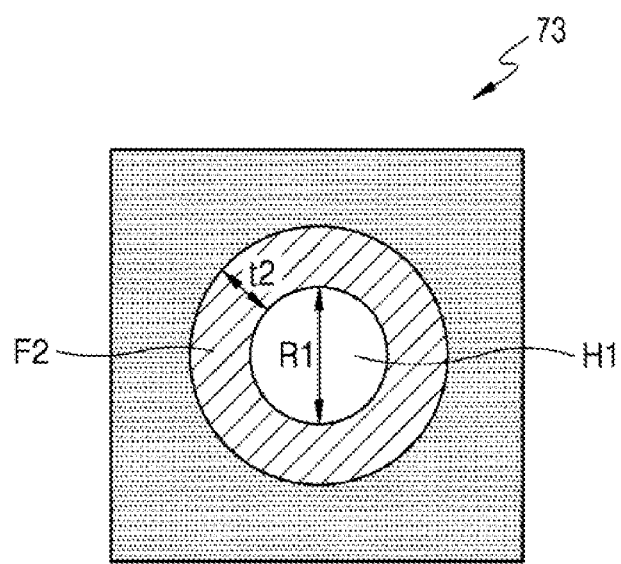
FIG. 12 is a schematic diagram illustrating a configuration of an optical filter that may be applied to the image display device of FIG. 9.

FIG. 9 is a schematic diagram illustrating a configuration of an image display device 103 according to an example embodiment. FIG. 10 is a schematic diagram illustrating a configuration of an optical filter 71 included in the image display device 103 of FIG. 9. FIG. 11 is a schematic diagram illustrating a configuration of an optical filter 72 that may be applied to the image display device 103 of FIG. 9. FIG. 12 is a schematic diagram illustrating a configuration of an optical filter 73 that may be applied to the image display device 103 of FIG. 9. The image display device 103 of FIG. 9 may be substantially the same as the image display device 102 of FIG. 7 except that the configuration of the optical filter 71 changes and a position of the second optical system 61 changes. In describing FIG. 9, descriptions redundant with FIGS. 3 to 7 will be omitted.

Referring to FIG. 9, the image display device 103 may include a main light source 10 that emits a first light, the display panel 20 that modulates the first light to add image information to the first light, the HOE 30 that diffracts the first light from the display panel 20 to make the first light travel to the first region 1 and generates a main image, the first optical system 40 provided on a traveling path of the first light between the main light source 10 and the HOE 30 and configured to change the traveling path of the first light such that the first light is incident on the HOE 30 along a first path, the auxiliary light source 50 emitting a second light, and the second optical system 61 provided on a traveling path of the second light and configured to change the traveling path of the second light such that the second light is incident on the HOE 30 along a second path different from the first path. In FIG. 9, the traveling path of the first light is indicated by a solid line, and the traveling path of the second light is indicated by a dotted line.

As shown in FIG. 9, the second optical system 61 may be provided on the traveling path of the second light between the auxiliary light source 50 and the display panel 20. Also, the second optical system 61 may change and direct the traveling path of the second light to the display panel 20.

Meanwhile, a collimating lens 41 collimating the first light emitted from the main light source 10 may be provided between the main light source 10 and the second optical system 61.

The second optical system 61 may include the at least one lens L1 and the beam splitter BS1 changing the traveling path of the second light. The beam splitter BS1 may be provided at a position to reflect and direct the second light that has passed through the at least one lens L1 to the display panel 20 and transmit and direct the first light that is emitted from the main light source 10 that has passed through the collimating lens 41 to the display panel 20. For example, the beam splitter BS1 may be provided at a point where a first path of the first light and a second path of the second light intersect between the main light source 10 and the display panel 20. In this case, a difference between the first path of the first light and the second path of the second light may be due to a difference in focal length between the collimating lens 41 and the at least one lens L1 included in the second optical system 61. In other words, the collimating lens 41 and the at least one lens L1 may have different focal lengths, and accordingly, the first path and the second path may be different from each other.

The beam splitter BS1 may transmit and direct a part of the first light incident along the first path to the display panel 20 and reflect and direct a part of the second light incident along the second path to the display panel 20.

The first main mirror 80 may reflect and direct the second light emitted from the auxiliary light source 50 and sequentially passing through the second optical system 61, the display panel 20, and the first optical system 40 to the HOE 30.

Meanwhile, the image display device 103 may further include the optical filter 71 provided between the first optical system 40 and the first main mirror 80. Before the first light and second light are incident on the first optical system 40, the first light and the second light which already followed different paths may travel along different paths even after they have passed through the first optical system 40. Accordingly, the first light may travel along a main path MP, and the second light may travel along a sub path SP. In this case, the main path MP may correspond to the first path, and the sub path SP may correspond to the second path. Referring to FIG. 10, the optical filter 71 may include the first hole H1 having a first diameter R1 formed in a region corresponding to the main path MP, that is, the center. Further, the optical filter 71 may include a second hole H2 formed in a region corresponding to the sub path SP, that is, a region surrounding the center. The second hole H2 may have a first width t1, may surround the first hole H1, and may have an annular shape sharing the center of the optical filter 71 with the first hole H1. Accordingly, the first light traveling along the main path MP may pass through the first hole H1, and the second light traveling along the sub path SP may pass through the second hole H2.

Meanwhile, referring to FIG. 11, the image display device 103 of FIG. 9 may include the optical filter 72 having a configuration different from that of the optical filter 71 of FIG. 10. As illustrated in FIG. 11, the optical filter 72 may include the first hole H1 having the first diameter R1 formed in the center. In addition, the optical filter 72 may include a plurality of third holes H3 surrounding the first hole H1, spaced apart from each other, and having a second diameter R2.

Meanwhile, referring to FIG. 12, the image display device 103 of FIG. 9 may include the optical filter 73 having a configuration different from that of the optical filter 71 of FIG. 10. As shown in FIG. 12, the optical filter 73 may include the first hole H1 having the first diameter R1 formed in the center. In addition, the optical filter 73 may include an annular light transmission-blocking film F2 surrounding the first hole H1 and sharing the center with the first hole H1. The light transmission-blocking film F2 may be controlled to transmit or block light by an electric signal applied from the outside. For example, the light transmission-blocking film F2 may include any one of a PDLC film or an LCD film.

Figure 13:
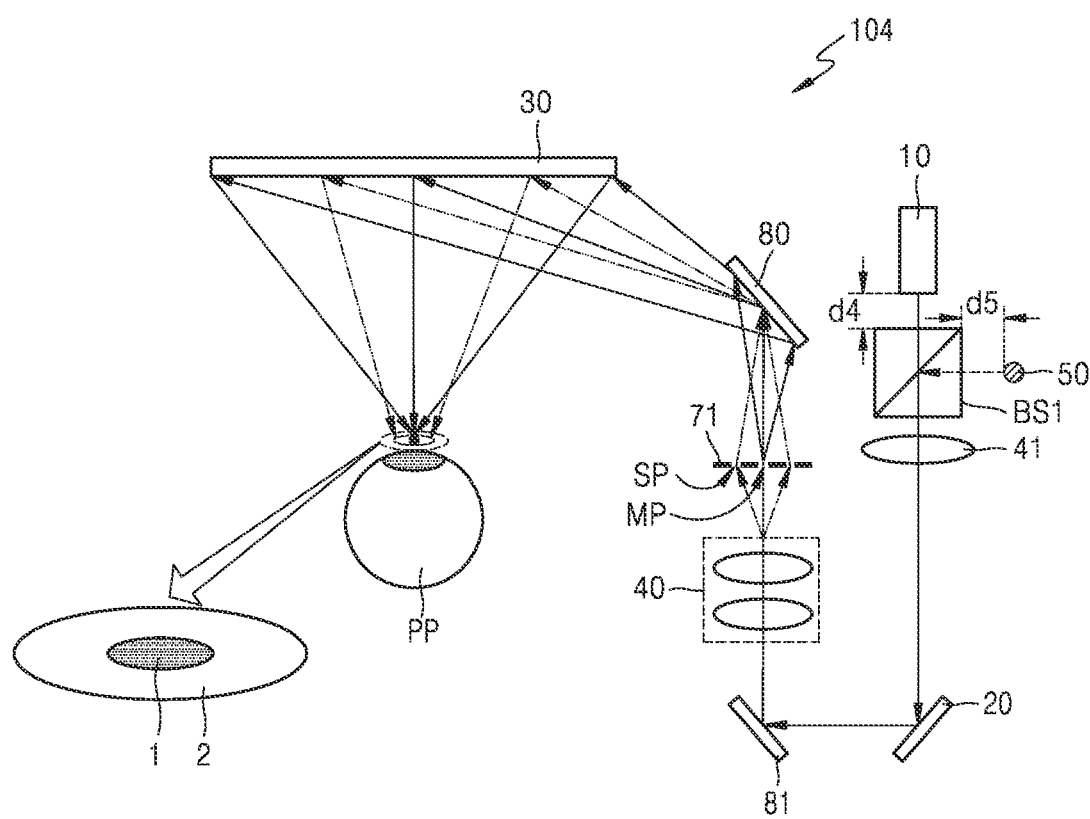
FIG. 13 is a schematic diagram illustrating a configuration of an image display device according to an example embodiment.

FIG. 13 is a schematic diagram illustrating a configuration of an image display device 104 according to an example embodiment. The image display device 104 of FIG. 13 may be substantially the same as the image display device 103 of FIG. 9 except that the image display device 104 includes the beam splitter BS1 instead of the second optical system 61. In describing FIG. 13, descriptions redundant with FIGS. 3 to 12 will be omitted.

Referring to FIG. 13, the image display device 104 may include the beam splitter BS1 provided on a traveling path of a second light between the auxiliary light source 50 and the display panel 20 and changing and directing the traveling path of the second light to the display panel 20. The beam splitter BS1 may be configured to reflect and direct the second light to the display panel 20 and transmit and direct the first light emitted from the main light source 10 to the display panel 20.

Meanwhile, a spaced distance d4 between the main light source 10 and the beam splitter BS1 and a spaced distance d5 between the auxiliary light source 50 and the beam splitter BS1 may be different from each other. For example, the spaced distance d4 between the main light source 10 and the beam splitter BS1 may be fixed, and the spaced distance d5 between the auxiliary light source 50 and the beam splitter BS1 may be adjusted. As described above, the image display device 104 may further include a driving device changing the position of the auxiliary light source 50 such that the distance between the auxiliary light source 50 and the beam splitter BS1 changes.

Figure 14:
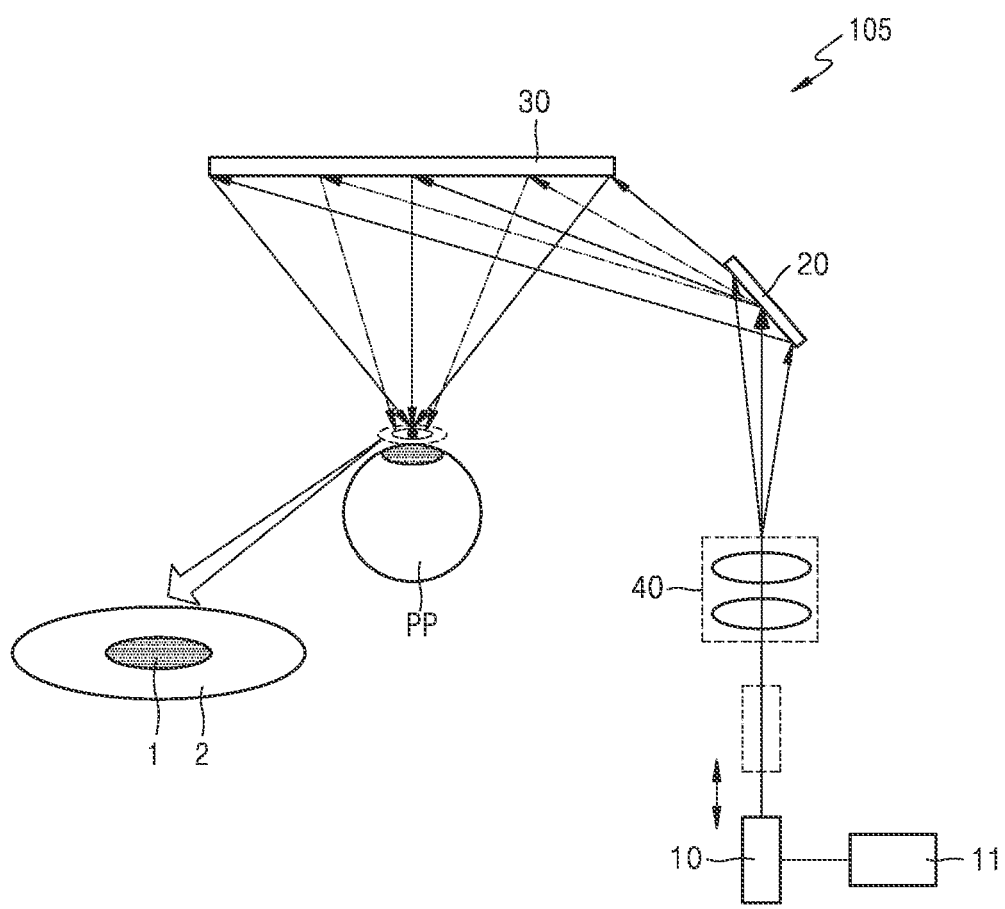
FIG. 14 is a schematic diagram illustrating a configuration of an image display device according to an example embodiment.

FIG. 14 is a schematic diagram illustrating a configuration of an image display device 105 according to an example embodiment. The image display device 105 of FIG. 14 may be substantially the same as the image display device 100 of FIG. 3 except that the image display device 105 does not include the second optical system 60 but further includes a driving device 11 changing the position of the main light source 10. In describing FIG. 14, descriptions redundant with FIGS. 3 to 4 will be omitted.

Referring to FIG. 14, the image display device 105 may include the main light source 10 that emits a light, the driving device 11 changing the position of the main light source 10 to a first position and a second position, the display panel 20 that modulates the light to add image information to the light, the HOE 30 that diffracts the light from the display panel 20 to make the light travel to a certain region, and the first optical system 40 provided on a traveling path of the light and configured to change the traveling path of the light such that the light is incident on the HOE 30 along a certain path.

Meanwhile, when the main light source 10 is disposed at the first position, the first optical system 40 may change the traveling path of the light such that the light is incident on the HOE 30 along the first path. In addition, when the main light source 10 is disposed at the second position, the first optical system 40 may change the traveling path of the light such that the light is incident on the HOE 30 along the second path. In FIG. 14, the traveling path of the first light is indicated by a solid line, and the traveling path of the second light is indicated by a dotted line.

The HOE 30 may diffract the light incident along the first path and make the light travel toward the first region 1 to generate a main image, and diffract the light incident along the second path and make the light travel toward the second region 2 surrounding the first region 1 to generate a guide image surrounding the main image.

As described above, unlike the image display device 100 of FIG. 3, the image display device 105 of FIG. 14 does not use the auxiliary light source 50 which is a separate configuration from the main light source 10 but uses the main light source 10 with a changing position, thereby generating the main image and the guide image.

Figure 15:
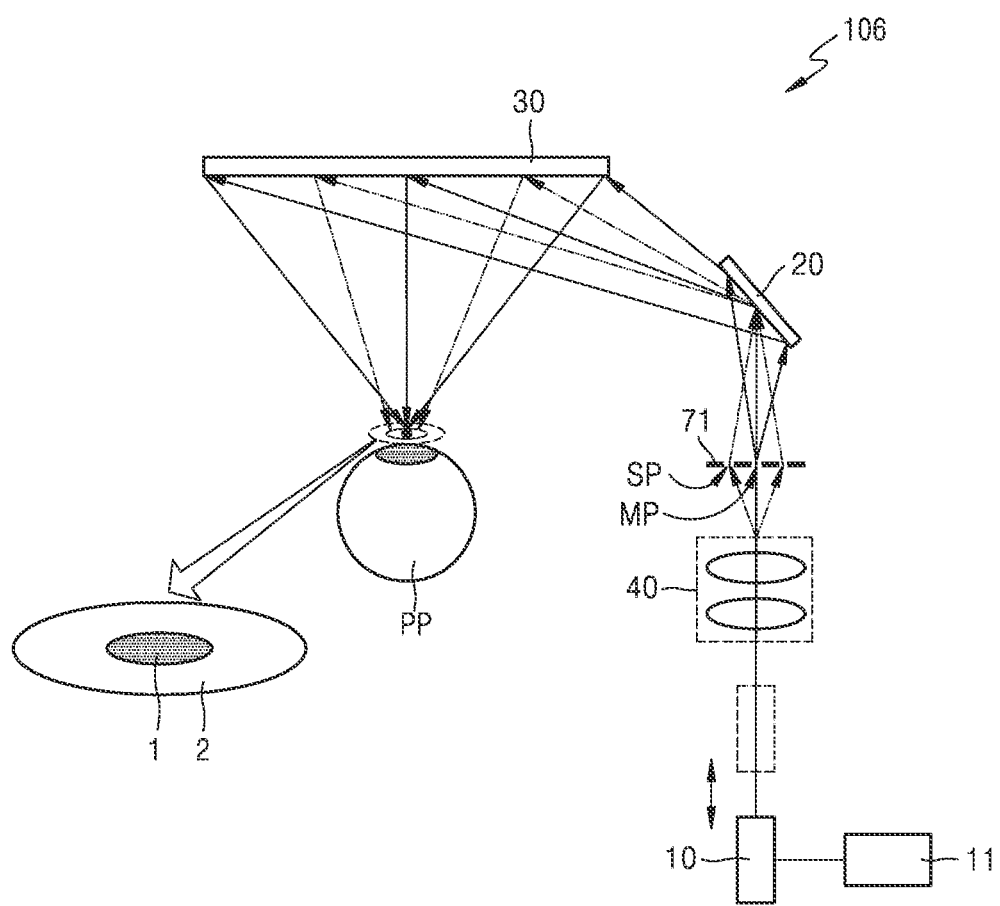
FIG. 15 is a schematic diagram illustrating a configuration of an image display device according to an example embodiment.

FIG. 15 is a schematic diagram illustrating a configuration of an image display device 106 according to an example embodiment. The image display device 106 of FIG. 15 may be substantially the same as the image display device 105 of FIG. 14 except that the image display device 106 further includes the optical filter 71. In describing FIG. 15, descriptions redundant with FIGS. 3, 4 and 14 will be omitted.

Referring to FIG. 15, the image display device 106 may further include the optical filter 71 provided on a traveling path of light between the display panel 20 and the first optical system 40. The optical filter 71 may transmit therethrough a part of the light that has passed through the first optical system 40 and block the other part of the first light. The configuration of the optical filter 71 is the same as described with reference to FIG. 10. Furthermore, the image display device 106 may include any one of the optical filters 72 and 73 described with reference to FIGS. 11 and 12, instead of the optical filter 71 of FIG. 10.

Figure 16:
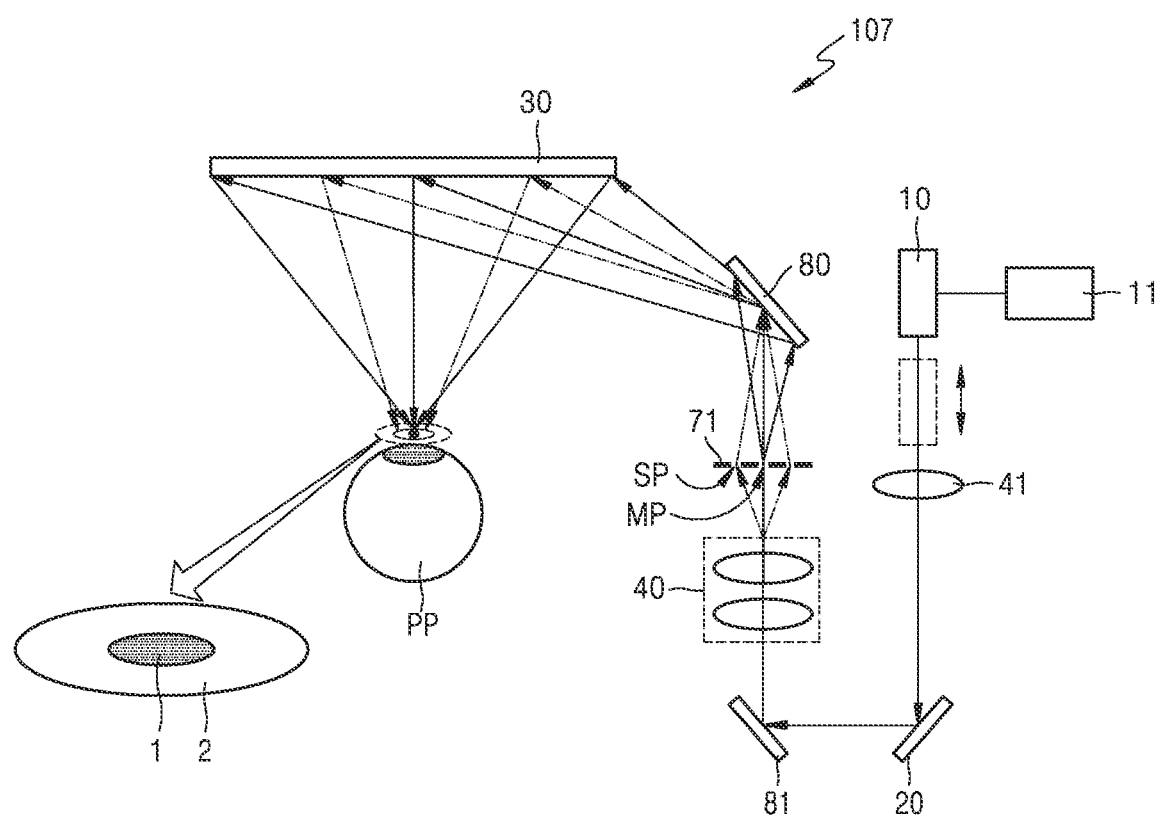
FIG. 16 is a schematic diagram illustrating a configuration of an image display device according to an example embodiment.

FIG. 16 is a schematic diagram illustrating a configuration of an image display device 107 according to an example embodiment. The image display device 107 of FIG. 16 may be substantially the same as the image display device 103 of FIG. 9 except that the image display device 107 does not include the second optical system 61 but further includes the driving device 11 changing a position of the main light source 10. In describing FIG. 16, descriptions redundant with FIGS. 3 to 7 and 9 will be omitted.

Referring to FIG. 16, the image display device 107 may include the main light source 10 that emits a light, the driving device 11 changing the position of the main light source 10 to a first position and a second position, the display panel 20 that modulates the light to add image information to the light, the HOE 30 that diffracts the light from the display panel 20 to make the light travel to a certain region, and the first optical system 40 provided on a traveling path of the light and configured to change the traveling path of the light such that the light is incident on the HOE 30 along a certain path.

Meanwhile, when the main light source 10 is disposed at the first position, the first optical system 40 may change the traveling path of the light such that the light is incident on the HOE 30 along the first path. In addition, when the main light source 10 is disposed at the second position, the first optical system 40 may change the traveling path of the light such that the light is incident on the HOE 30 along the second path. In FIG. 16, the traveling path of the first light is indicated by a solid line, and the traveling path of the second light is indicated by a dotted line.

The HOE 30 may diffract and make the light incident along the first path travel toward the first region 1 to generate a main image, and may diffract and make the light incident along the second path travel toward the second region 2 surrounding the first region 1 to generate a guide image surrounding the main image.

As described above, unlike the image display device 103 of FIG. 9, the image display device 107 of FIG. 16 does not use the auxiliary light source 50 which is a separate configuration from the main light source 10 but uses the main light source 10 with a changing position, thereby generating the main image and the guide image.

Figure 17:
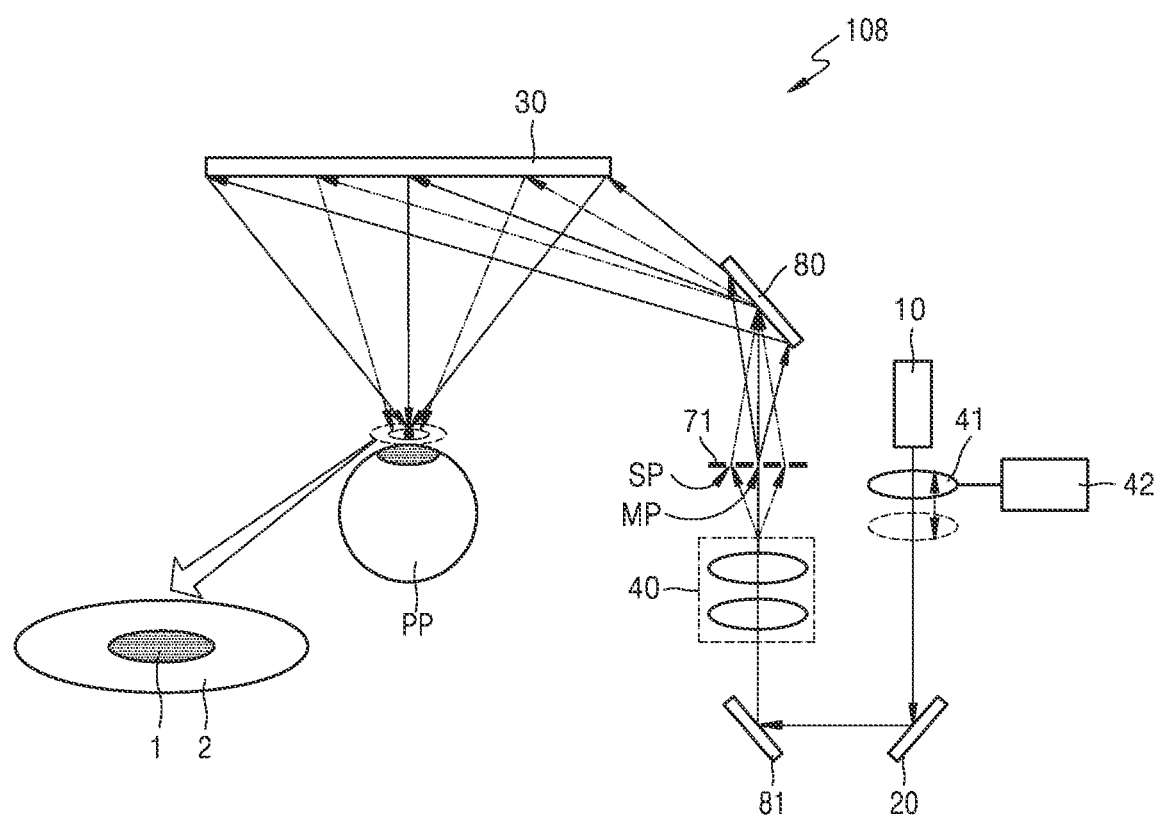
FIG. 17 is a schematic diagram illustrating a configuration of an image display device according to an example embodiment.
Figure 18:
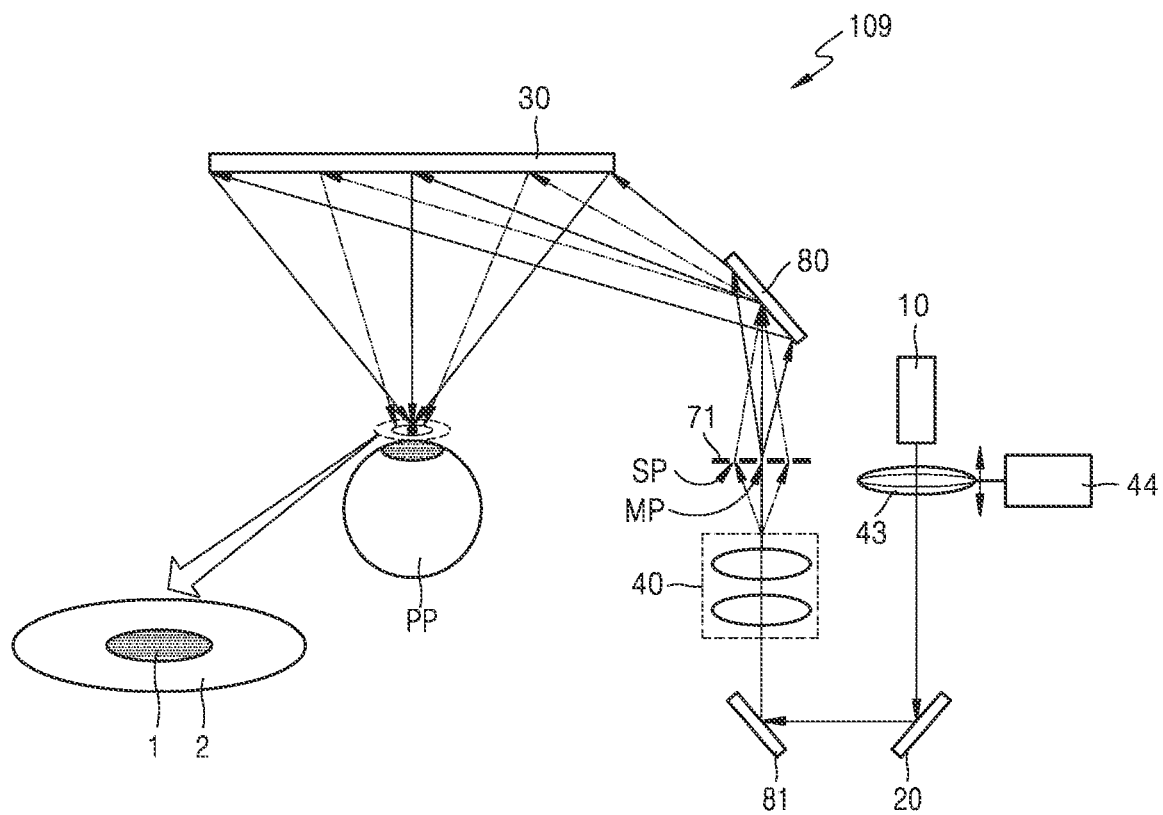
FIG. 18 is a schematic diagram illustrating a configuration of an image display device according to an example embodiment.

FIG. 17 is a schematic diagram illustrating a configuration of an image display device 108 according to an example embodiment. FIG. 18 is a schematic diagram illustrating a configuration of an image display device 109 according to an example embodiment. The image display devices 108 and 109 of FIGS. 17 and 18 are different from the image display device 107 of FIG. 16 in that the image display devices 108 and 109 further respectively include driving devices 42 and 44 changing the state of the collimating lens 41, instead of the driving device 11 changing the position of the main light source 10. In describing FIGS. 17 and 18, descriptions redundant with FIGS. 3 to 7, 9 and 16 will be omitted.

Referring to FIGS. 17 and 18, the image display device 108 may include the main light source 10 that emits a light, the collimating lens 41 collimating the light, the driving device 42 electrically controlling the collimating lens 41 and changing the collimating lens 41 to a first state or a second state, the display panel 20 modulating the light that has passed through the collimating lens 41 to add image information to the light, the HOE 30 diffracting the light from the display panel 20 to make the light travel to a certain region, and the first optical system 40 provided on a traveling path of the light and configured to change the traveling path of the light such that the light is incident on the HOE 30 along a certain path.

Meanwhile, when the collimating lens 41 is in the first state, the first optical system 40 may change the traveling path of the light such that the light is incident on the HOE 30 along a first path. In addition, when the collimating lens 41 is in the second state, the first optical system 40 may change the traveling path of the light such that the light is incident on the HOE 30 along a second path. The HOE 30 may diffract the light incident along the first path and make the light travel toward the first region 1 to generate a main image, and may diffract the light incident along the second path and make the light travel toward the second region 2 surrounding the first region 1 to generate a guide image surrounding the main image.

Referring to FIG. 17, the driving device 42 may change the position of the collimating lens 41. In this case, the first state may mean a state in which the collimating lens 41 is provided at a first position. Further, the second state may mean a state in which the collimating lens 41 is provided at a second position different from the first position.

Referring to FIG. 18, the driving device 44 may change the refractive power of the collimating lens 43. For example, the driving device 44 may change the refractive power by adjusting the thickness of the collimating lens 43. In this case, the first state may mean a state in which the collimating lens 43 has a first refractive power. Further, the second state may mean a state in which the collimating lens 43 has a second refractive power different from the first refractive power. In this case, the collimating lens 43 may include a lens having variable refractive power.

Figure 19:
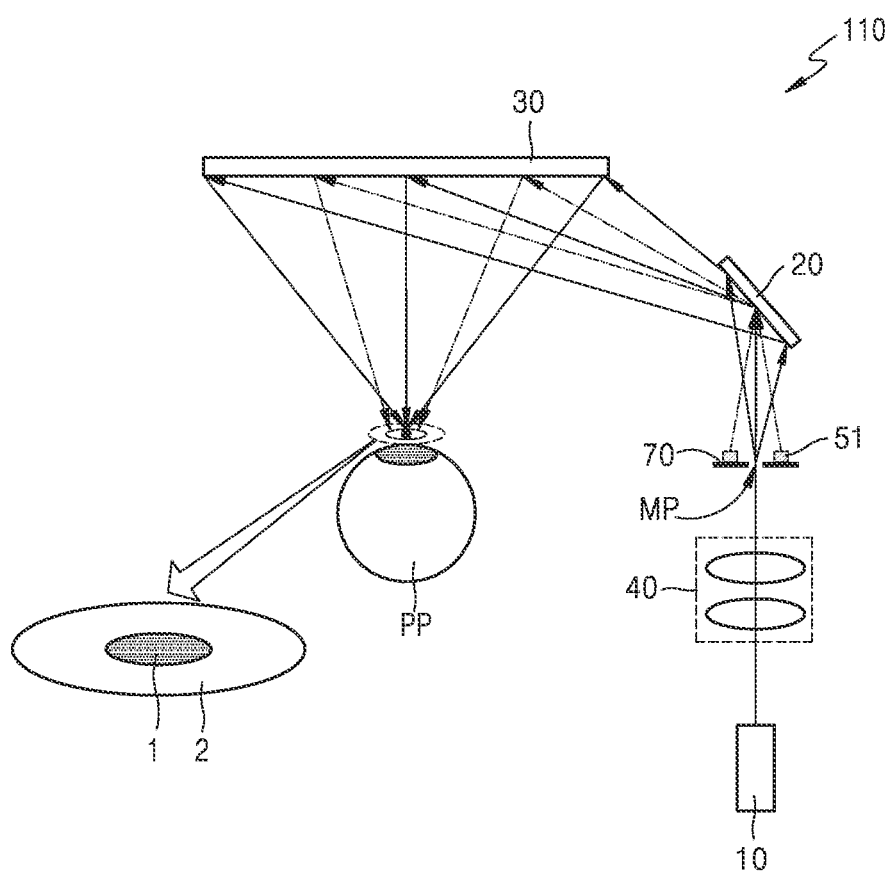
FIG. 19 is a schematic diagram illustrating a configuration of an image display device according to an example embodiment.
Figure 20:
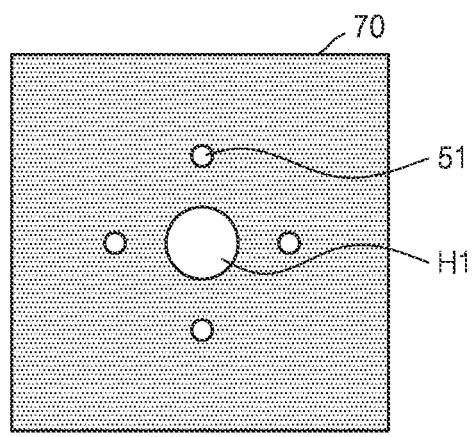
FIG. 20 is a schematic diagram illustrating a configuration of an optical filter and an auxiliary light source included in the image display device of FIG. 19.

FIG. 19 is a schematic diagram illustrating a configuration of an image display device 110 according to an example embodiment. FIG. 20 is a schematic diagram illustrating a configuration of the optical filter 70 and an auxiliary light source 51 included in the image display device 110 of FIG. 19. The image display device 110 of FIG. 19 may be substantially the same as the image display device 100 of FIG. 3 except that the image display device 110 does not include the second optical system 60 and further includes the auxiliary light source 51 and the optical filter 70. In describing FIG. 19, descriptions redundant with FIGS. 3 to 4 will be omitted.

Referring to FIG. 19, the image display device 100 may include the main light source 10 that emits a first light, the display panel 20 that modulates the first light to add image information to the first light, the HOE 30 that diffracts the first light from the display panel 20 to make the first light travel to the first region 1 and generates a main image, the first optical system 40 provided on a traveling path of the first light between the main light source 10 and the HOE 30 and configured to change the traveling path of the first light such that the first light is incident on the HOE 30 along a first path, the optical filter 70 provided on the traveling path of the first light between the first optical system 40 and the HOE 30 and transmitting therethrough only a part of the first light that has passed through the first optical system 40, and the auxiliary light source 51 provided on the optical filter 70 and emitting a second light. The second light emitted from the auxiliary light source 51 may travel along a second path. In FIG. 19, the traveling path of the first light is indicated by a solid line, and the traveling path of the second light is indicated by a dotted line.

The HOE 30 may diffract the second light from the auxiliary light source 51 incident along a second path different from the first path and make the second light travel toward the second region 2 surrounding the first region 1 to generate a guide image surrounding the main image. In other words, the HOE 30 may diffract and make the light incident along the first path travel toward the first region 1 to generate the main image, and may diffract and make the light incident along the second path travel toward the second region 2 surrounding the first region 1 to generate the guide image surrounding the main image.

The auxiliary light source 51 may be substantially the same as the auxiliary light source 50 of FIG. 3. For example, the auxiliary light source 51 may include an LED element. However, the present disclosure is not limited thereto, and the auxiliary light source 51 may include a laser diode (LD). In addition, as shown in FIG. 20, a plurality of auxiliary light sources 51 may be provided on the optical filter 70 including the first hole H1 formed in the center. For example, the plurality of auxiliary light sources 51 may surround the first hole H1 and be spaced apart from each other.

As described above, unlike the image display device 100 of FIG. 3, the image display device 110 of FIG. 19 may provide the auxiliary light source 51 which is a configuration separate from the main light source 10 on the optical filter 70. By providing the auxiliary light source 51 on the optical filter 70 as described above, the image display device 110 may generate the guide image surrounding the main image without having the separate second optical system 60.

According to an example embodiment, the image display device forming the guide image surrounding an eye box and an AR device including the same may allow viewers to easily find the eye box formed by the image display device.

According to an example embodiment, the guide image surrounding the eye box may be formed by using the auxiliary light source which is a configuration separate from the main light source that emits light forming the eye box.

According to an example embodiment, without the separate auxiliary light source, by changing a position of the main light source or changing a position or refractive power of a certain optical system or element that changes a traveling path of light emitted from the main light source, the light from the main light source may be irradiated to the HOE along different paths. As described above, the main image and the guide image surrounding the main image may be generated by using light incident on the HOE along different paths.

It should be understood that example embodiments described herein should be considered in a descriptive sense only and not for purposes of limitation. Descriptions of features or aspects within each example embodiment should typically be considered as available for other similar features or aspects in other example embodiments. While example embodiments have been described with reference to the figures, it will be understood by those of ordinary skill in the art that various changes in form and details may be made therein without departing from the spirit and scope as defined by the following claims.

What is claimed is:

1. An image display device comprising:
a main light source configured to emit a first light;
a display panel configured to modulate the first light to add image information to the first light;
a holographic optical element (HOE) configured to diffract the first light emitted from the display panel to make the first light travel to a first region to generate a main image;
a first optical system provided on a traveling path of the first light between the main light source and the HOE, the first optical system being configured to change the traveling path of the first light to be incident on the HOE along a first path;
an auxiliary light source configured to emit a second light; and
a second optical system provided on a traveling path of the second light, the second optical system being configured to change the traveling path of the second light to be incident on the HOE along a second path different from the first path,
wherein the HOE is further configured to diffract the second light incident through the second path to make the second light travel toward a second region surrounding the first region to generate a guide image surrounding the main image,
wherein the second optical system is provided on the traveling path of the second light between the auxiliary light source and the display panel to direct the second light to the display panel, and
wherein the display panel is further configured to change and direct the traveling path of the second light emitted from the auxiliary light source and passing through the second optical system to the HOE along the second path.

2. The image display device of claim 1, wherein the HOE comprises an interference pattern formed by a reference light incident along the first path and a signal light incident along a third path different from the first path.

3. The image display device of claim 1, wherein the first optical system comprises at least one lens.

4. The image display device of claim 1, wherein the display panel is provided on the traveling path of the first light between the first optical system and the HOE and is configured to change and direct the traveling path of the first light emitted from the main light source and passing through the first optical system to the HOE along the first path.

5. The image display device of claim 4, wherein the second optical system comprises at least one lens and at least one auxiliary mirror configured to change the traveling path of the second light.

6. The image display device of claim 4, wherein the second optical system comprises at least one lens configured to change the traveling path of the second light, and a beam splitter configured to reflect and direct the second light passing through the at least one lens to the display panel, and
wherein the beam splitter is further configured to transmit and direct the first light passing through the first optical system to the display panel.

7. The image display device of claim 6, further comprising a driving device configured to change a position of the at least one lens to change a distance between the at least one lens and the beam splitter.

8. The image display device of claim 1, wherein the first light emitted from the main light source comprises coherent light.

9. An image display device comprising:
a main light source configured to emit a first light;
a display panel configured to modulate the first light to add image information to the first light;
a holographic optical element (HOE) configured to diffract the first light emitted from the display panel to make the first light travel to a first region to generate a main image;
a first optical system provided on a traveling path of the first light between the main light source and the HOE, the first optical system being configured to change the traveling path of the first light to be incident on the HOE along a first path;
an auxiliary light source configured to emit a second light; and
a second optical system provided on a traveling path of the second light, the second optical system being configured to change the traveling path of the second light to be incident on the HOE along a second path different from the first path,
wherein the HOE is further configured to diffract the second light incident through the second path to make the second light travel toward a second region surrounding the first region to generate a guide image surrounding the main image,
wherein the display panel is provided on the traveling path of the first light between the main light source and the first optical system and is configured to change and direct the traveling path of the first light emitted from the main light source to the first optical system, and
wherein the image display device further comprises a first main mirror provided on the traveling path of the first light between the first optical system and the HOE and configured to reflect and direct the first light modulated by the display panel and passing through the first optical system to the HOE.

10. The image display device of claim 9, wherein the second optical system is provided on the traveling path of the second light between the auxiliary light source and the first main mirror,
wherein the second optical system is configured to change and direct the traveling path of the second light to the first main mirror, and
wherein the first main mirror is further configured to reflect and direct the second light emitted from the auxiliary light source and passing through the second optical system to the HOE.

11. The image display device of claim 10, wherein the second optical system comprises:
at least one lens configured to change the traveling path of the second light; and
a beam splitter configured to reflect and direct the second light passing through the at least one lens to the first main mirror and transmit and direct the first light passing through the first optical system to the first main mirror.

12. The image display device of claim 11, further comprising a driving device configured to change a position of the at least one lens to change a distance between the at least one lens and the beam splitter.

13. The image display device of claim 9, wherein the second optical system is provided on the traveling path of the second light between the auxiliary light source and the display panel to change and direct the traveling path of the second light to the display panel, and
   wherein the first main mirror is further configured to reflect and direct the second light emitted from the auxiliary light source and sequentially passing through the second optical system, the display panel, and the first optical system to the HOE.

14. The image display device of claim 13, wherein the second optical system comprises a beam splitter configured to reflect and direct the second light to the display panel and transmit and direct the first light emitted from the main light source to the display panel.

15. The image display device of claim 14, wherein the second optical system comprises at least one lens provided between the beam splitter and the auxiliary light source and configured to change and direct the traveling path of the second light to the beam splitter.

16. The image display device of claim 14, further comprising a driving device configured to change a position of the auxiliary light source to change a distance between the auxiliary light source and the beam splitter.

17. The image display device of claim 9, further comprising a second main mirror provided on the traveling path of the first light between the display panel and the first optical system, the second main mirror being configured to change and direct the traveling path of the first light from the display panel to the first optical system.

18. The image display device of claim 9, further comprising a collimating lens provided on the traveling path of the first light between the main light source and the display panel, the collimating lens being configured to collimate the first light.

19. The image display device of claim 9, further comprising an optical filter provided on the traveling path of the first light between the first main mirror and the first optical system, the optical filter being configured to transmit therethrough a part of the first light passing through the first optical system.

20. The image display device of claim 19, wherein the optical filter comprises a first hole formed in a center thereof.

21. The image display device of claim 20, wherein the optical filter further comprises an annular second hole surrounding the first hole, and
   wherein a center of the annular second hole is positioned at the center of the optical filter.

22. The image display device of claim 20, wherein the optical filter further comprises a plurality of third holes surrounding the first hole and spaced apart from each other.

23. The image display device of claim 20, wherein the optical filter further comprises an annular light transmission-blocking film surrounding the first hole, the annular light transmission-blocking film transmitting or blocking light according to an electric signal applied thereto, and
   wherein a center of the annular light transmission-blocking film is positioned at the center of the optical filter.

* * * * *